United States Patent
Finkler et al.

(10) Patent No.: US 12,468,931 B2
(45) Date of Patent: Nov. 11, 2025

(54) CONFIGURING A NEURAL NETWORK USING SMOOTHING SPLINES

(71) Applicant: International Business Machines Corporation, Armonk, NY (US)

(72) Inventors: Ulrich Alfons Finkler, Mahopac, NY (US); Michele Merler, New York City, NY (US); Mayoore Selvarasa Jaiswal, Austin, TX (US); Hui Wu, White Plains, NC (US); Rameswar Panda, Medford, MA (US); Wei Zhang, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1012 days.

(21) Appl. No.: 17/075,963

(22) Filed: Oct. 21, 2020

(65) Prior Publication Data
US 2022/0121924 A1    Apr. 21, 2022

(51) Int. Cl.
*G06F 18/211*    (2023.01)
*G06F 18/21*    (2023.01)
(Continued)

(52) U.S. Cl.
CPC .............. *G06N 3/08* (2013.01); *G06F 18/211* (2023.01); *G06F 18/217* (2023.01); *G06N 7/01* (2023.01)

(58) Field of Classification Search
CPC .......... G06N 3/08; G06N 7/01; G06F 18/211; G06F 18/217
See application file for complete search history.

(56) References Cited

U.S. PATENT DOCUMENTS 7,734,564 B2    6/2010    Kaseda et al.
10,482,355 B2    11/2019   Heifets et al.

FOREIGN PATENT DOCUMENTS

CN    109117954 A    1/2019

OTHER PUBLICATIONS

Anwar, A., et al., Cost-Aware Metering with Scalable Service Management Infrastructure, [received Nov. 28, 2023]. Retrieved from Internet:<https://ieeexplore.ieee.org/abstract/document/7214056> (Year: 2015).*

(Continued)

*Primary Examiner* — Miranda M Huang
*Assistant Examiner* — Bart I Rylander
(74) *Attorney, Agent, or Firm* — Garg Law Firm, PLLC; Rakesh Garg; James Olsen

(57) ABSTRACT

An embodiment includes identifying an initial plurality of sets of hyperparameter values at which to evaluate an objective function that relates hyperparameter values to performance values of a neural network. The embodiment also executes training processes on the neural network with the hyperparameters set to the each of the initial sets of hyperparameter values such that the training process provides an initial set of the performance values for the objective function. The embodiment also generates an approximation of the objective function using splines at selected performance values. The embodiment approximates a point at which the approximation of the objective function reaches a maximum value, then determines an updated set of hyperparameter values associated with the maximum value. The embodiment then executes a runtime process using the neural network with the hyperparameters set to the updated set of hyperparameter values.

13 Claims, 10 Drawing Sheets

(51) Int. Cl.
   G06N 3/08    (2023.01)
   G06N 7/01    (2023.01)

(56) References Cited

OTHER PUBLICATIONS

Aszemi, N., et al., Hyperparameter Optimization in Convolutional Neural Network using Genetic Algorithms, [received Nov. 28, 2023]. Retrieved from Internet:<https://www.researchgate.net/profile/Nurshazlyn-Mohd-Aszemi/publication/334151021_Hyperparameter_O > (Year: 2019).*

Bemporad, A., Global optimization via inverse distance weighting and radial basis functions, [received Nov. 28, 2023]. Retrieved from Internet:<https://ui.adsabs.harvard.edu/abs/2019arXiv190606498B/abstract> (Year: 2019).*

Dass, J., et al., Fast and Communication-Efficient Algorithm for Distributed Support Vector Machine Training, [received Nov. 28, 2023]. Retrieved from Internet:<https://ieeexplore.ieee.org/abstract/document/8526323> (Year: 2018).*

Gupta, K., et al., Calibration of Neural Networks using Splines, [received Nov. 28, 2023]. Retrieved from Internet:<https://arxiv.org/abs/ 2006.12800> (Year: 2020).*

Lee, W., et al., Optimal hyperparameter tuning of convolutional neural networks based on the parameter-setting-free harmony search algorithm, [received Nov. 28, 2023]. Retrieved from Internet:<https://www.sciencedirect.com/science/article/pii/S0030402618310167> (Year: 2018).*

Li, Y., et al., Hyper-Parameter Optimization Using MARS Surrogate for Machine-Learning Algorithms, [received Nov. 28, 2023]. Retrieved from Internet:<https://ieeexplore.ieee.org/abstract/document/8735959> (Year: 2019).*

MacKay, D., Comparison of Approximate Methods for Handling Hyperparameters, [received Nov. 28, 2023]. Retrieved from Internet:<https://ieeexplore.ieee.org/abstract/document/6790802>(Year: 1999).*

Mohamed, S., et al., Monte Carlo Gradient Estimation in Machine Learning, [received Nov. 28, 2023]. Retrieved from Internet:<https://dl.acm.org/doi/abs/10.5555/3455716.3455848> (Year: 2020).*

Wahba, G., Multivariate Function and Operator Estimation, Based on Smoothing Splines and Reproducing Kernels, [received Nov. 28, 2023]. Retrieved from Internet:<chrome-extension://efaidnbmnn-nibpcajpcglclefindmkaj/https://pages.stat.wisc.edu/~wahba/ftp1/oldie/santafe1992.pdf> (Year: 1997).*

Zhang, S., et al., High Accuracy Matrix Computations on Neural Engines: A Study of QR Factorization and its Applications, [received Nov. 28, 2023]. Retrieved from Internet:<https://dl.acm.org/doi/abs/10.1145/3369583.3392685> (Year: 2020).*

Becherer, N., et al., Improving optimization of convolutional neural networks through parameter fine-tuning, [received on Apr. 24, 2024]. Retrieved from Internet:<https://link.springer.com/article/10.1007/s00521-017-3285-0> (Year: 2019).*

Chen et al. "Big-Little Net: An Efficient Multi-Scale Feature Representation for Visual and Speech Recognition", arXiv:1807.03848 [cs.CV], Jul. 31, 2019, 20 pages.

Codreanu et al. "Achieving Deep Learning Training in less than 40 Minutes on ImageNet-1K & Best Accuracy and Training Time on ImageNet-22K & Places-365 with Scale-out Intel® Xeon®/Xeon Phi™ Architectures", Surf Communities, May 9, 2022, 14 pages.

He et al. "Deep Residual Learning for Image Recognition", arXiv:1512.03385v1 [cs.CV], Dec. 10, 2015, 12 pages.

Xie et al. "Aggregated Residual Transformations for Deep Neural Networks", arXiv:1611.05431v2 [cs.CV], Apr. 11, 2017, 10 pages.

Hryniowski et al., PolyNeuron: Automatic Neuron Discovery via Learned Polyharmonic Spline Activations, Nov. 10, 2018.

Hryniowski et al., DeepLABNet: End-to-end Learning of Deep Radial Basis Networks with Fully Learnable Basis Functions, Nov. 21, 2019.

Wistuba et al., A Survey on Neural Architecture Search, Jun. 18, 2019.

Liu et al., DARTS: Differentiable Architecture Search, ICLR 2019, Apr. 23, 2019.

Elsken et al., Neural Architecture Search: A Survey, Journal of Machine Learning Research 20 (2019) 1-21, Apr. 23, 2019.

Zoph et al., Neural Architecture Search With Reinforcement Learning, ICLR 2017, Feb. 15, 2017.

Xie et al., SNAS: Stochastic Neural Architecture Search, ICLR 2019, Apr. 1, 2020.

* cited by examiner

| ITERATION | CONV1 | CONV2 | CONV3 | CONV4 | CONV5 | MEAS. ACC | PRED. ACC |
|---|---|---|---|---|---|---|---|
| 1 | 150 | 300 | 600 | 1200 | 2400 | 0.3803 | - |
| 2 | 32 | 32 | 32 | 32 | 32 | 0.1033 | |
| 3 | 150 | 32 | 32 | 32 | 32 | 0.1054 | |
| 4 | 32 | 300 | 32 | 32 | 32 | 0.1546 | |
| 5 | 32 | 32 | 600 | 32 | 32 | 0.1945 | |
| 6 | 32 | 32 | 32 | 1200 | 32 | 0.2315 | |
| 7 | 32 | 32 | 32 | 32 | 2400 | 0.3125 | |
| 8 | 75 | 150 | 300 | 600 | 1200 | 0.3546 | |
| 9 | 32 | 300 | 600 | 1200 | 2400 | 0.3803 | |
| 10 | 150 | 32 | 600 | 1200 | 2400 | 0.3715 | |
| 11 | 150 | 300 | 32 | 1200 | 2400 | 0.3676 | |
| 12 | 150 | 300 | 600 | 32 | 2400 | 0.3440 | |
| 13 | 150 | 300 | 600 | 1200 | 32 | 0.2904 | |
| 14 | 50 | 116 | 330 | 1200 | 2400 | 0.3731 | 0.4102 |
| 15 | 80 | 208 | 475 | 736 | 2400 | | 0.3892 |

CONFIGURING A NEURAL NETWORK USING SMOOTHING SPLINES

BACKGROUND

The present invention relates generally to a method, system, and computer program product for configuring a neural network. More particularly, the present invention relates to a method, system, and computer program product for configuring a neural network using smoothing splines.

Artificial intelligence (AI) technology has evolved significantly over the past several years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs can model complex non-linear relationships. For example, a Convolutional Neural Network (CNN) is a type of DNN that is particularly well-suited for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

SUMMARY

The illustrative embodiments provide for configuring a neural network using smoothing splines. An embodiment includes identifying an initial plurality of sets of hyperparameter values at which to evaluate an objective function that relates hyperparameter values of a neural network to respective performance values. The embodiment also includes executing training processes on the neural network with hyperparameters set to the initial plurality of sets of hyperparameter values such that the training process provides an initial set of the performance values for the objective function. The embodiment also includes generating an approximation of the objective function using splines at selected performance values. The embodiment also includes approximating a point at which the approximation of the objective function reaches a maximum value. The embodiment also includes determining an updated set of hyperparameter values associated with the maximum value. The embodiment also includes executing a runtime process using the neural network with the hyperparameters set to the updated set of hyperparameter values. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
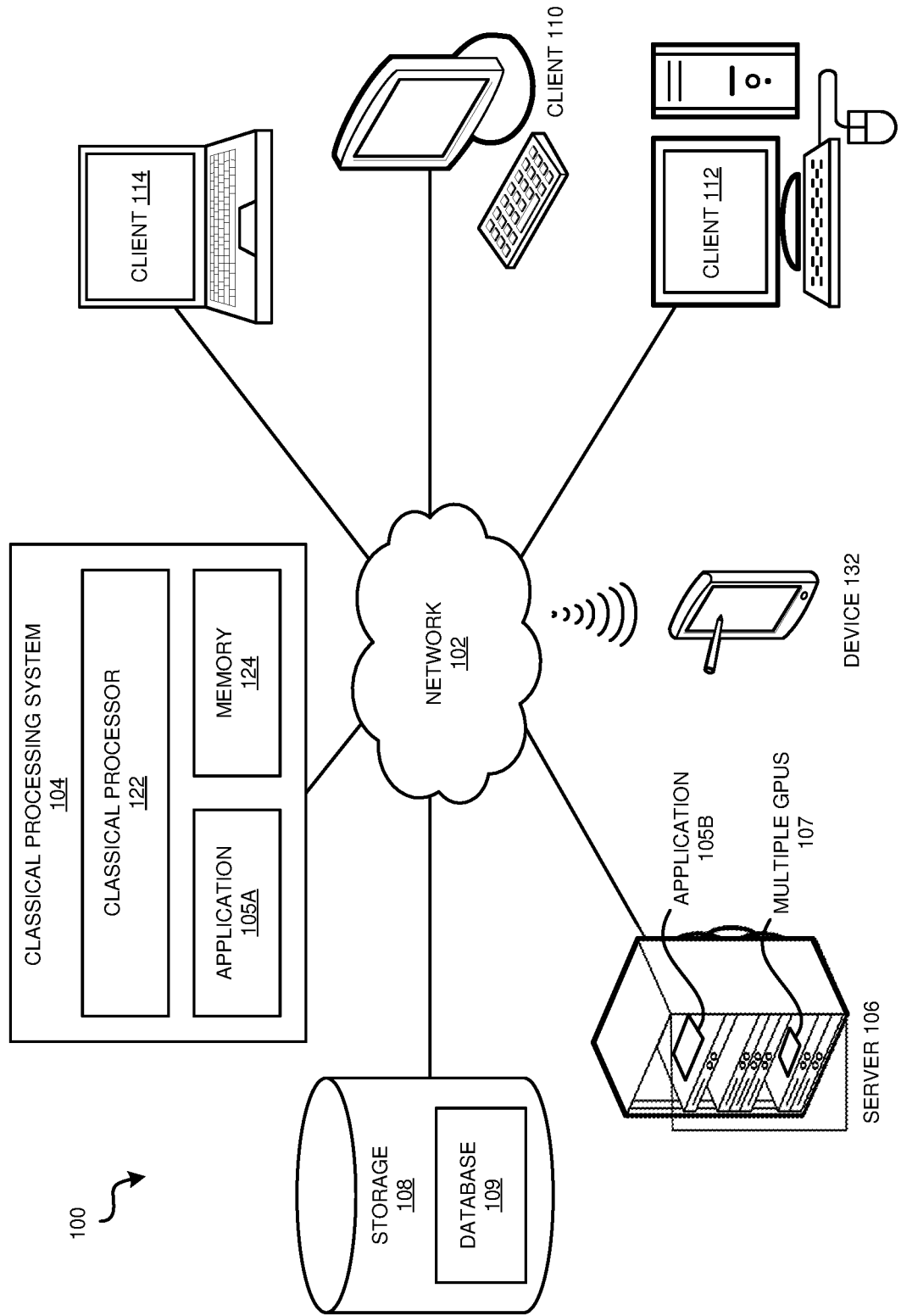
FIG. 1 depicts a block diagram of a network of data processing systems in which illustrative embodiments may be implemented.

Various AI technologies utilize neural networks to perform a variety of machine learning tasks. A neural network is typically trained through numerous iterations over vast amounts of data. The accuracy of the neural network relies on the amount and/or type of data used to train the neural network. For example, the more unique data (e.g., non-duplicate data) used to train a neural network, the more accurate the neural network generally becomes. As a result, training an accurate neural network is very time-consuming and computationally expensive.

For example, in training a neural network to correctly identify faces, thousands of photographs of faces (of people, animals, famous faces, and so on) are input into the neural network as training data. The neural network processes each photograph using weights from hidden layers, comparing the training output against the desired output. A goal is that the training output matches the desired output, e.g., for the neural network to correctly identify each photo (facial recognition).

When the error rate is sufficiently small (e.g., the desired level of matching occurs), the neural network can be said to have reached "convergence." In some situations, convergence means that the training error is below an acceptable threshold. In some embodiments, the neural network begins with a high error rate, as high as 100% in some cases. Errors (e.g., incorrect identifications) get propagated back for further processing, often through multiple iterations, with the neural network continually updating the weights. The number of iterations increases with the sample size, for example in excess of 100,000 iterations.

A neural network has several configurable aspects referred to as "hyperparameters" whose values are set before the neural network is trained and sometimes adjusted during the training process. Some of the hyperparameters are used while training a neural network (e.g., the learning technique for learning parameters of the neural network may depend on values of the hyperparameters), and some of the hyperparameters are used during run-time (e.g., the way in which a trained neural network processes new data may depend on values of the hyperparameters).

For a given new dataset, the selection of hyperparameters for training the neural network directly affect the performance of the neural network at runtime. For example, in some neural networks, each layer is assigned a "learning rate," which is a hyperparameter that controls how much the weights of that layer will be adjusted while the pre-trained neural network is being re-trained. Generally, the learning rate is raised to allow for greater weight change and lowered to allow for lesser weight change. Typically learning rates are configured naively at random by the user. At best, the user would leverage past experiences (or other types of learning material) to gain the intuition on what is the best value to use in setting learning rates. However, this technique is time-consuming, less than optimal, and prone to errors.

Existing techniques for configuring a neural network involve selecting values for one or more hyperparameters with the goal of optimizing the performance of the trained neural network, e.g., by minimizing error rate. Techniques for selecting values for hyperparameters include selecting values manually (e.g., based on past experience), selecting values by a brute-force or a Grid Search method that tries every possible combination of hyperparameter values, or by random selection that tries random combinations of hyperparameter values. Also, many of these techniques use full evaluation of hyperparameter points (e.g. cardinality of a cell within a residual network, network depth). In high dimensional spaces, e.g. eight or more hyperparameters, random sampling and evolutional approaches require a large number of sampling points to approximate an optimum with reasonable quality. Given that training a single configuration on a large problem, e.g. large image datasets having millions of images and thousands of classes, takes hundreds or thousands of GPU hours, computation costs for many sampling points (e.g., 100 sampling points) are prohibitive.

The illustrative embodiments recognize that there is a need for improved techniques for configuring a neural network that provides improved accuracy for the neural network, allows a system to select hyperparameter values using less memory than required for prior hyperparameter-selection techniques, results in faster computation time without sacrificing the quality of the resulting hyperparameters as occurred in prior processes, and produces neural networks that have improved accuracy. The illustrative embodiments include configuring a neural network, where various embodiments of configuring of the neural network include one or more of find an optimized neural network structure, optimal sizings, and hyperparameters.

As used herein, the term "machine learning task" refers to any application of AI technologies that automatically and/or autonomously learns and/or improves from an experience (e.g., training data) rather than from explicit programming. For example, in some embodiments, machine learning tasks utilize one or more algorithms to facilitate supervised and/or unsupervised learning to perform tasks such as classification, regression, and/or clustering.

As used herein, the term "neural network model" refers to any computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, where data with known outcomes is inputted into the computer model, outputs regarding the data are compared to the known outcomes, and/or the weights of the computer model are autonomously adjusted based on the comparison to replicate the known outcomes.

As used herein, the term "training data" refers to any data and/or datasets used to train one or more neural network models. As a neural network model trains (e.g., utilizes more training data), the neural network model becomes increasingly accurate. Thus, trained neural network models can accurately analyze data with unknown outcomes, based on lessons learning from training data, to facilitate one or more machine learning tasks. Examples of neural network models include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), convolutional neural network ("CNN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), kohonen network ("KN"), support vector machine ("SVM"), and/or neural turing machine ("NTM").

An embodiment may be implemented as a software application. The application implementing an embodiment may be configured as a modification of an existing analysis system, as a separate application that operates in conjunction with an existing analysis system, a standalone application, or some combination thereof.

In some embodiments, an automated fine-tuning system re-trains and refines the hyperparameters of a neural network that was pre-trained to model a previous dataset. The fine-tuning system adjusts the hyperparameters of the pre-trained neural network and repurposes the pre-trained neural network to model a new dataset.

Embodiments of the new and previous datasets comprise data elements of various types, which represent information in one or more forms of media. For example, the new and previous datasets can comprise data elements such as, but not limited to: images (e.g., photos, maps, drawings, paintings, and/or the like), text (e.g., messages, books, literature, signs, encyclopedias, dictionaries, thesauruses, contracts, laws, constitutions, scripts, and/or the like), videos (e.g., video segments, movies, plays, and/or the like), audio recordings, audio signals, labels, speech, conversations, people, tools, fruits, fabrics, buildings, furniture, garments, music, nature, plants, trees, fugus, foods, animals, knowledge bases, a combination thereof, and/or like. The new and previous datasets can comprise any type of computer data and can represent a variety of topics. Thus, the various embodiments described herein are not limited to the analysis of a particular type and/or format of data.

In some embodiments, a process for configuring a neural network using smoothing splines identifies an initial set of hyperparameter values as support points at which to evaluate an objective function that relates hyperparameter values of a neural network to respective performance values, such as values representative of an error rate or classification accuracy of a neural network. In an embodiment, a set of hyperparameter values are used for the initial support points where each hyperparameter value is associated a different hyperparameter.

For example, in an embodiment, the neural network is a convolutional neural network having a series of convolution groups, and the hyperparameters are the numbers of filters used for respective groups. However, the filters example is not intended to be limiting, as there are many different hyperparameters that may be used, and the selection of such hyperparameters will be implementation-specific in many situations.

In some embodiments, the neural network is configured for classifying images. However, the image classifier example is not intended to be limiting, as there are many different types of machine-learning algorithms that may be used, and the selection of such algorithm will be implementation-specific in many situations.

In some embodiments, the performance values comprise an error rate. However, the error-rate example is not intended to be limiting, as there are many different types of performance metrics that may be used, and the selection of such performance metric will be implementation-specific in many situations.

In some embodiments, multiple processes train the neural network with the hyperparameters set to each of a collection of initial sets of hyperparameter values. In an embodiment, the training processes provide an initial set of the performance values for the objective function, one for each initial hyperparameter set.

In some embodiments, the process then begins an iterative process that starts with generating an approximation of the objective function using splines at selected performance values. In some embodiments, the splines used for generating the approximation of the objective function comprise polyharmonic splines. In some embodiments, the generating of the approximation of the objective function uses polyharmonic splines by assembling the approximation using radial basis functions. In some embodiments, the iterative process continues with calculating a coefficient for the approximation of the objective function using QR decomposition. In some embodiments, the QR decomposition used for calculating the coefficient for the approximation of the objective function comprises a householder QR decomposition. In some embodiments, the iterative process then approximates a point at which the approximation of the objective function reaches a maximum value. In some embodiments, the process approximates the point at which the approximation of the objective function reaches the maximum value comprises using a hierarchical Monte Carlo technique. In some embodiments, the iterative process then determines an updated set of hyperparameter values associated with the maximum value. In some embodiments, the iterative process next determines whether an updated performance metric based on the use of the updated hyperparameters is within a desired tolerance. For example, in some embodiments, the process determines whether an error rate of the approximation of the objective function is below a predetermined or desired threshold value. If so, in some embodiments, the process completes the iterative process, and continues to execute a runtime process using the neural network with the hyperparameters set to the updated set of hyperparameter values. Otherwise, the iterative process adds an additional support point and then begins again. Thus, in some embodiments, the process performs iterations of the iterative process until the performance of the neural network is as desired or until the process is otherwise interrupted. For example, a user may determine that the iterative process should be interrupted if it appears that the process is not resulting in convergence of performance-related values as desired.

In some embodiments, the process includes optimizing network parameters for macro (global network sizings) and micro (network subcell layout parameters) with polyharmonic splines, which under weak assumptions is still very likely to find a good approximation of the minimum with a small number of evaluation points. For example, in some embodiments, the process determines optima for two families of neural networks (e.g., resnet and blresnext) with an automated process. In an experiment, an embodiment of this process using a large image dataset having millions of images and thousands of classes resulted in world leading evaluation top 1 accuracy >41.5% (improving over the best previously published result of 36.7%).

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
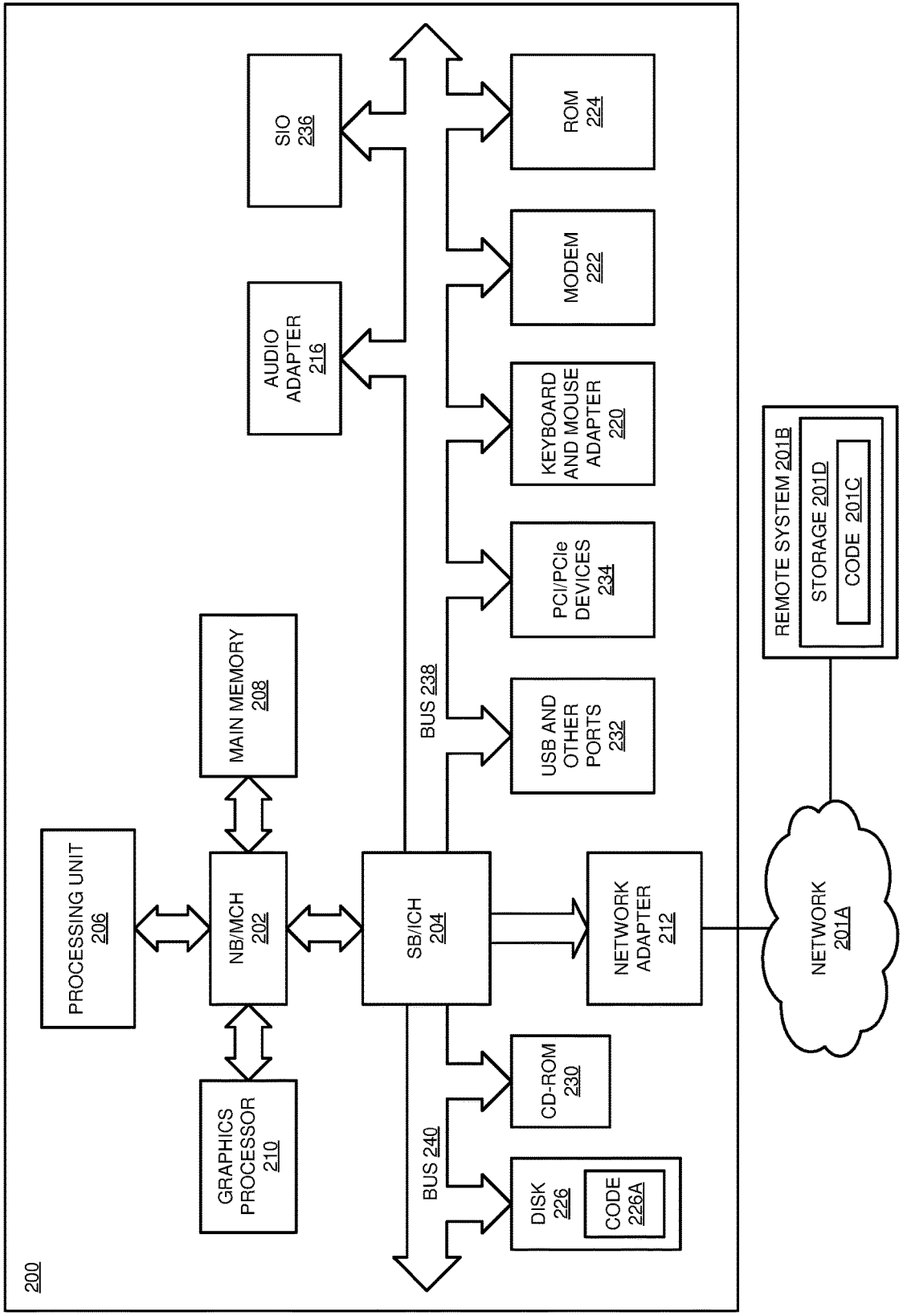
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of a matrix selection application, machine-learning application, or other data processor function described herein in accordance with one or more embodiments. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions are located or executed for implementing matrix selection applications, machine-learning applications, or other data processor functions described herein in accordance with one or more embodiments.

Data processing system 200 is also representative of a conventional data processing system or a configuration therein, such as conventional data processing system 132 in FIG. 1 in which computer usable program code or instructions are located or executed for implementing matrix selection applications, machine-learning applications, or other data processor functions described herein in accordance with one or more embodiments. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, such as instructions for implementing matrix selection applications, machine-learning applications, or other data processor functions described herein in accordance with one or more embodiments, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally conFig.d with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
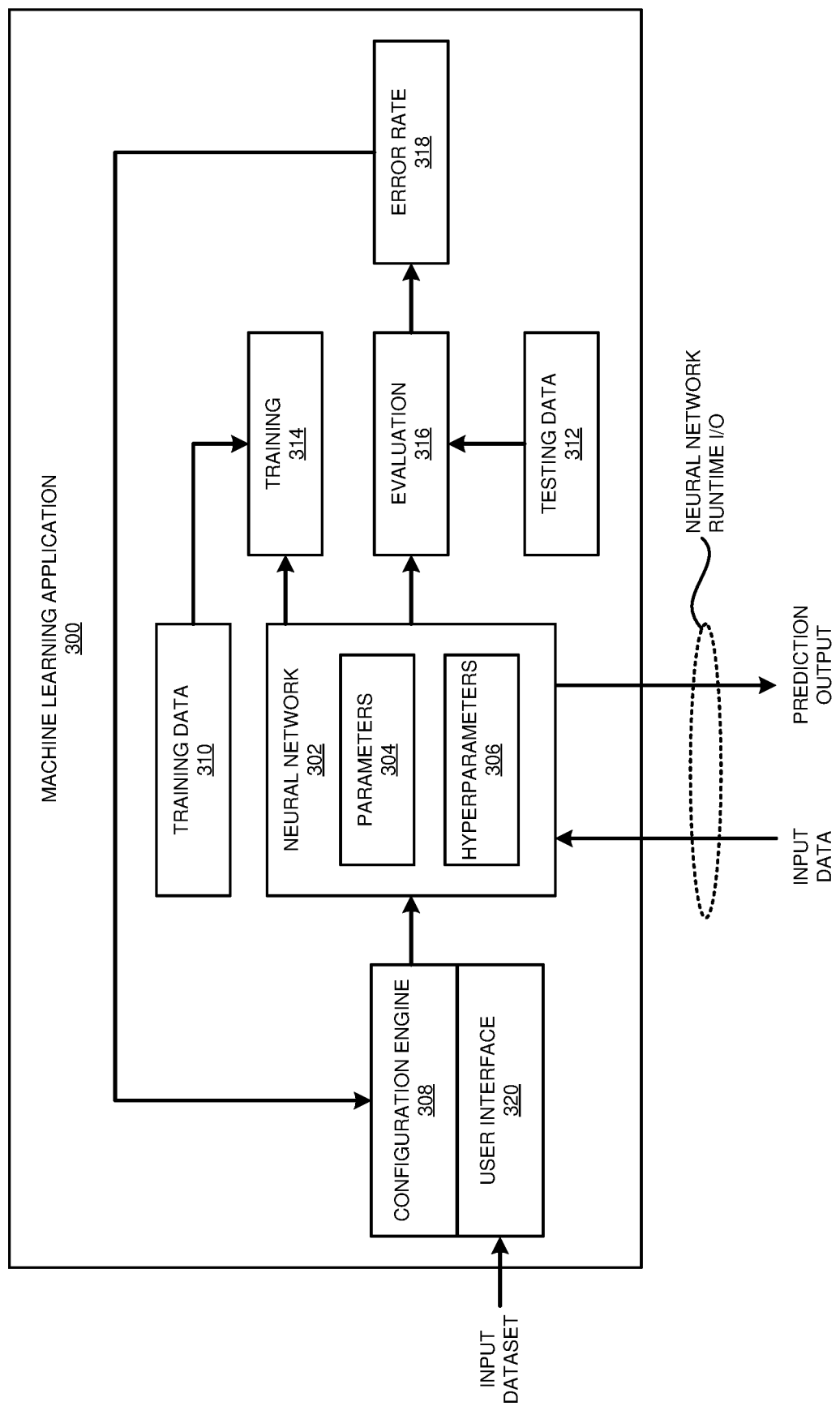
FIG. 3 depicts a block diagram of an example machine learning application in accordance with an illustrative embodiment.

With reference to FIG. 3, this figure depicts a block diagram of an example machine learning application 300 in accordance with an illustrative embodiment. In a particular embodiment, machine learning application 300 is an example of neural network application 105A/105B of FIG. 1.

In the illustrated embodiment, machine learning application 300 includes a neural network 302, a configuration engine 308, training data 310, testing data 312, a training module 314, an evaluation module 316, and a user interface 320. Although illustrated as separate elements, one or more of the modules in FIG. 3 may represent portions of a single module or application. In some embodiments, the neural network 302 is an image classifier, while in alternative embodiments the neural network 302 is configured for any of a variety of machine learning applications.

In the illustrated embodiment, the neural network 302 is configured by the configuration engine 308, including setting values for hyperparameters 306. The neural network 302 then "learns" the values for parameters 304 during training by the training module 314 using training data 310. The performance of the configured neural network 302 is then evaluated by the evaluation module 316, which uses the testing data 312 to calculate one or more values providing an error rate 318 or other such measure of performance of the configured neural network 302. As one non-limiting example, in some embodiments, neural network 302 is a classifier comprising multiple layers associated with one or more hyperparameters 306 (e.g., one or more learning rates, one or more dropout rates, one or more weight norms, one or more hidden layer sizes, convolutional kernel size when the neural network is a convolutional neural network, pooling size, etc.). The performance of the neural network 302 (e.g., the generalization performance) is sensitive to values of the hyperparameters 306 and setting the values of the hyperparameters 306 to suboptimal values leads to suboptimal performance of the neural network 302.

In some embodiments, the training module 314 generates values for parameters 304 for neural network 302. In an embodiment, the neural network 302 is a selected from, and/or based on one or more known deep learning neural network structures/systems, such as a CNN. In an embodiment, training module 314 trains the neural network 302 using training data 310 appropriate for the current domain being modeled. For example, in an embodiment, the neural network 302 is trained to classify articles of clothing by the training module 314, which trains the neural network 302 using images showing various articles of clothing.

In some embodiments, the evaluation module 316 monitors the ability of the neural network 302 to make predictions using testing data 312. For example, in some embodiments, the testing data 312 includes data that has not been previously processed by the neural network 302 in order to allow the evaluation module 316 to evaluate the neural network 302 and generate error rate data 318. In some embodiments, the testing data 312 includes images and classification information for each image. In some such embodiments, the evaluation module 316 inputs testing data 312 for images to the neural network 302 and compares the output from the neural network 302 to the classification information for the images in order to determine the accuracy of the neural network 302. In some embodiments, the error rate data 318 indicates how accurately the neural network 302 can make predictions about the historical data set 312.

In the illustrated embodiment, the error rate 318 data that is output from the evaluation module 316 is fed back to the configuration engine 308. In some embodiments, the configuration engine 308 adjusts one or more values of hyperparameters 306, and the neural network 302 repeats the training and evaluation by the training module 314 and evaluation module 316 using the updated values for the hyperparameters 306, and the results from the evaluation module 316 are again fed back to the configuration engine 308. In some embodiments, this process of the configuration engine 308 adjusting values of hyperparameters 306 and then training and testing the neural network using the adjusted values for the hyperparameters 306, continues for one or more iterations. In some embodiments, the number of iterations is based on user input via the user interface 320 that is provided from the user interface 320 to the configuration engine 308, such as a threshold value for a performance parameter or a designated number of iterations. For example, in some embodiments, the user interface 320 receives input from a user for the configuration engine 308 to continue iterations until a threshold error rate is reached or a maximum number of iterations is reached.

In some embodiments, at runtime the neural network 302 receives input data, for example representative of one or more images. In some embodiments, neural network 302 also pre-processes the input data (e.g., normalization of data, formatting, or cleanup), or receives the input image data after pre-processing by another system or application, before performing the classification processing of the input data. In some embodiments, the neural network 302 infers and makes predictions about the input data. For example, in some embodiments, the neural network 302 assigns a class or label to an image received as input data. In some embodiments, the neural network 302 assigns a class or label to a group of pixels received as input data using a segmentation algorithm. In an embodiment, the neural network 302 predicts classifications for images of the input data and outputs the classified image data as prediction output. In some embodiments, the neural network 302 classifies images in the input data according to characteristics of pixels or superpixels of the images.

Figure 4:
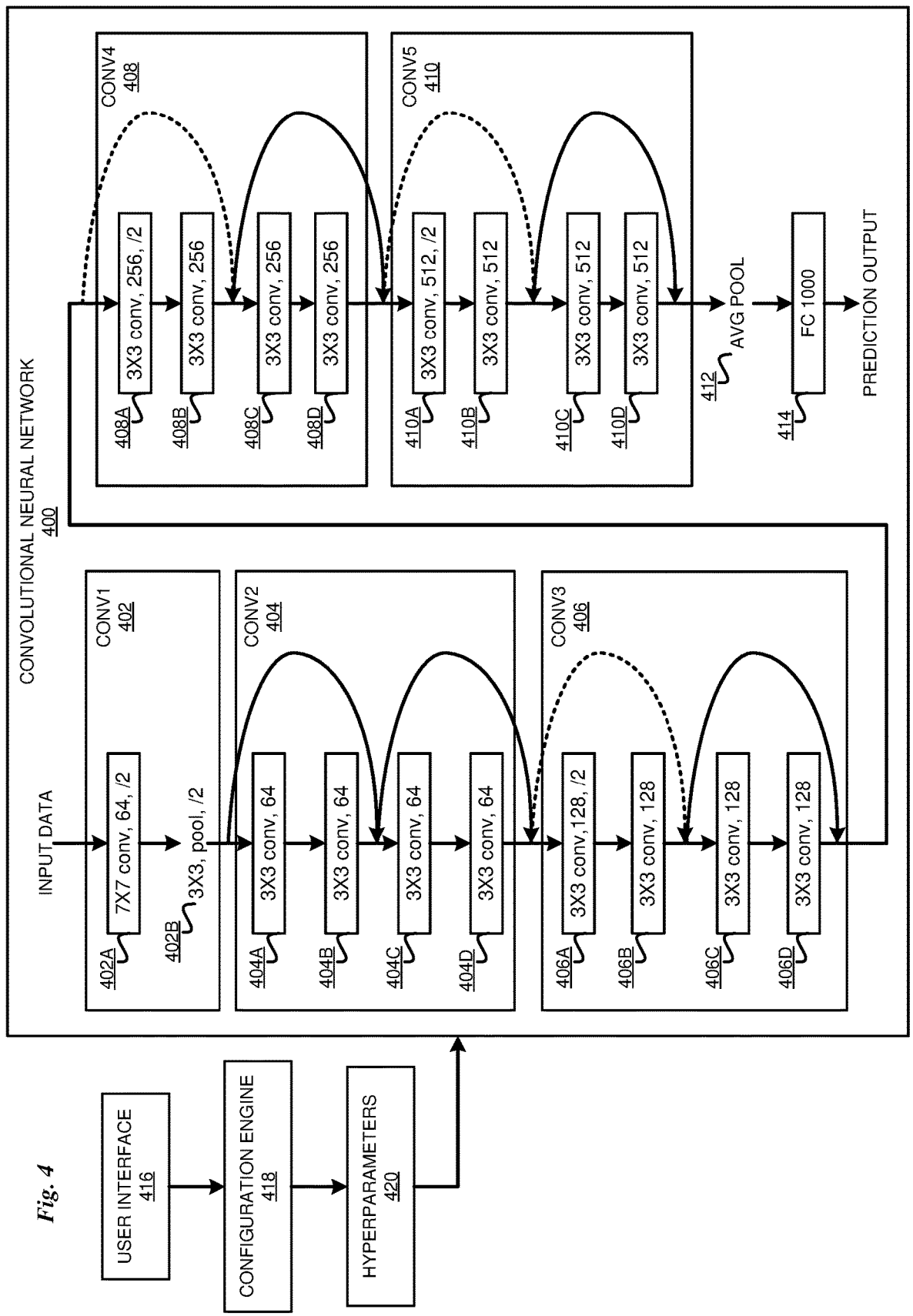
FIG. 4 depicts a block diagram of an example convolutional neural network (CNN) 400 in accordance with an illustrative embodiment.

With reference to FIG. 4, this figure depicts a block diagram of an example convolutional neural network (CNN) 400 in accordance with an illustrative embodiment. In a particular embodiment, CNN 400 is an example of neural network 302 of FIG. 3.

In the illustrated embodiment, the CNN 400 includes, as a default configuration, a plurality of convolution operations conceptionally organized into convolution groups CONV1-CONV5. The CNN 400 receives image data at CONV1 402, which includes a convolution layer 402a and dmax pooling layer 402b. The convolution layers in FIG. 4 are each labeled according to an associated size and type of kernel operation, followed by number of filters (i.e., feature map size). The first convolution layer 402a, the max pooling layer 402b, and the first layers of groups CONV3-CONV5 also include an indication of stride (i.e., "/2"), which is used for down sampling at these points in the CNN 400. For example, convolution layer 402a is labeled "7×7 cony, 64, /2" corresponding to a convolution operation on the image data using convolution kernel size 7 and 64 filters with a stride of 2. Also, solid and dashed arrows show skip connections for gradient data according to known techniques for avoiding the vanishing gradient problem, with solid arrows indicating identity shortcuts that simply bypass operations, and dashed arrows indicating projection shortcuts that includes a convolution or other operations for size matching when image data bypasses a down sampling operation.

The convolution layer 402a is followed by a 3×3 max pooling operation with a stride of 2. Next, at CONV2 404, the CNN 400 includes convolution layers 404a-404d, which each correspond to a convolution operation on the image data using convolution kernel size 3 and 64 filters. CONV2 404 is followed by CONV3 406. CONV3 406 includes convolution layers 406a-406d, which each correspond to a convolution operation on the image data using convolution kernel size 3 and 128 filters, and stride 2 in the case of convolution layer 406a. Next, CONV4 408 includes convolution layers 408a-408d, which each correspond to a convolution operation on the image data using convolution kernel size 3 and 256 filters, and stride 2 in the case of convolution layer 408a. Finally, CONV5 410 includes convolution layers 410a-410d, which each correspond to a convolution operation on the image data using convolution kernel size 3 and 512 filters, and stride 2 in the case of convolution layer 410a. The final group CONV5 410 is followed by an average pooling layer 412 and a fully connected dense layer 414.

In the illustrated embodiment, a configuration engine 418 is configured to make changes to the architecture, structure, sizings, and other various aspects of the CNN 400, which for the sake of convenience are all referred to herein as hyperparameters 420. In an embodiment, the configuration engine 418 is an example of configuration engine 308 of FIG. 3. The configuration engine 418 determines values of hyperparameters 420 according to processes described herein.

In some embodiments, the configuration engine 418 operates to find optimized values for designated hyperparameters 306 for a new dataset/problem. The configuration engine 418 searches a multidimensional parameter search space $f(x[1],x[2], \ldots x[n])$ for "n" hyperparameters, where "n" is representative of the any desired number of hyperparameters. In some embodiments, the configuration engine 418 creates an approximation $f'(x[1],x[2], \ldots x[n]) \approx f(x[1],x[2], \ldots x[n])$ that is fast to evaluate for an optimum. In some embodiments, the configuration engine 418 uses polyharmonic splines to assemble f' out of radial basis functions minimizing the second derivative over the hypersurface.

Polyharmonic splines are a technique that allows for finding differentiable functions $f(X)$ in higher dimensional spaces that pass through a given set of support points and minimize the 'curvature' of the hypersurface defined by the scalar function $f(X)$, where X is a vector in the parameter space and f(X) satisfies a given metric, for example the top1 evaluation accuracy or another desired metric. Algebraic analysis shows that for relevant parameters of CNNs, an underlying hypersurface is likely to exist and suggests that its oscillation is limited, which is confirmed by experimental data. Based on this analysis we optimized for micro (within the cell out of which the network is composed) and macro (shaping the composition of the overall network) parameters.

In some embodiments, In some embodiments, the configuration engine 418 identifies an initial set of hyperparameter values for selected hyperparameters 420 as support points at which to evaluate an objective function that relates hyperparameter values of CNN 400 to respective performance values, such as values representative of an error rate or classification accuracy of CNN 400. In an embodiment, a set of hyperparameter values are used for the initial support points where each hyperparameter value is associated a different hyperparameter 420.

For example, in an embodiment, the hyperparameters 420 used for support points are the hyperparameter values representative of the numbers of filters used for respective groups CONV1-CONV5. However, the filters example is not intended to be limiting, as there are many different hyperparameters that may be used, and the selection of such hyperparameters will be implementation-specific in many situations.

In some embodiments, the CNN 400 is configured for classifying images. However, the image classifier example is not intended to be limiting, as there are many different types of machine-learning algorithms that may be used, and the selection of such algorithm will be implementation-specific in many situations.

In some embodiments, the performance values comprise an error rate. However, the error-rate example is not intended to be limiting, as there are many different types of performance metrics that may be used, and the selection of such performance metric will be implementation-specific in many situations.

In some embodiments, the CNN 400 has been trained with the hyperparameters set to the initial set of hyperparameter values. In an embodiment, the training process provides an initial set of the performance values for the objective function.

In some embodiments, the configuration engine 418 performs an iterative process that starts with generating an approximation of the objective function using splines at selected performance values. In some embodiments, the splines used for generating the approximation of the objective function comprise polyharmonic splines. In some embodiments, the generating of the approximation of the objective function uses polyharmonic splines by assembling the approximation using radial basis functions. In some embodiments, the iterative process continues with calculating a coefficient for the approximation of the objective function using QR decomposition. In some embodiments, the QR decomposition used for calculating the coefficient for the approximation of the objective function comprises a householder QR decomposition. In some embodiments, the iterative process then approximates a point at which the approximation of the objective function reaches a maximum value. In some embodiments, the process approximates the point at which the approximation of the objective function reaches the maximum value comprises using a hierarchical Monte Carlo technique. In some embodiments, the iterative process then determines an updated set of hyperparameter values associated with the maximum value. In some embodiments, the iterative process next determines whether an updated performance metric based on the use of the updated hyperparameters is within a desired tolerance. For example, in some embodiments, the process determines whether an error rate of the approximation of the objective function is below a predetermined or desired threshold value. If so, in some embodiments, the process completes the iterative process, and continues to execute a runtime process using the CNN 400 with the hyperparameters set to the updated set of hyperparameter values. Otherwise, the iterative process adds an additional support point and then begins again. Thus, in some embodiments, the process performs iterations of the iterative process until the performance of the CNN 400 is as desired or until the process is otherwise interrupted. For example, a user may determine that the iterative process should be interrupted if it appears that the process is not resulting in convergence of performance-related values as desired.

Figure 5:
FIG. 5 depicts table listing values for hyperparameters and associated results produced by a CNN during an optimization process in accordance with an illustrative embodiment.

With reference to FIG. 5, this figure depicts a table 500 listing values for hyperparameters and associated results produced by a CNN 400 during iterations of an optimization process in accordance with an illustrative embodiment. In a particular embodiment, the table 500 is an example of error rate data 318 of FIG. 3. In the illustrated embodiment, the table 500 includes a plurality of rows, where each row corresponds with a respective iteration. The columns show the hyperparameter values for number of filters per group for each iteration, and the measured accuracy.

Figure 6:
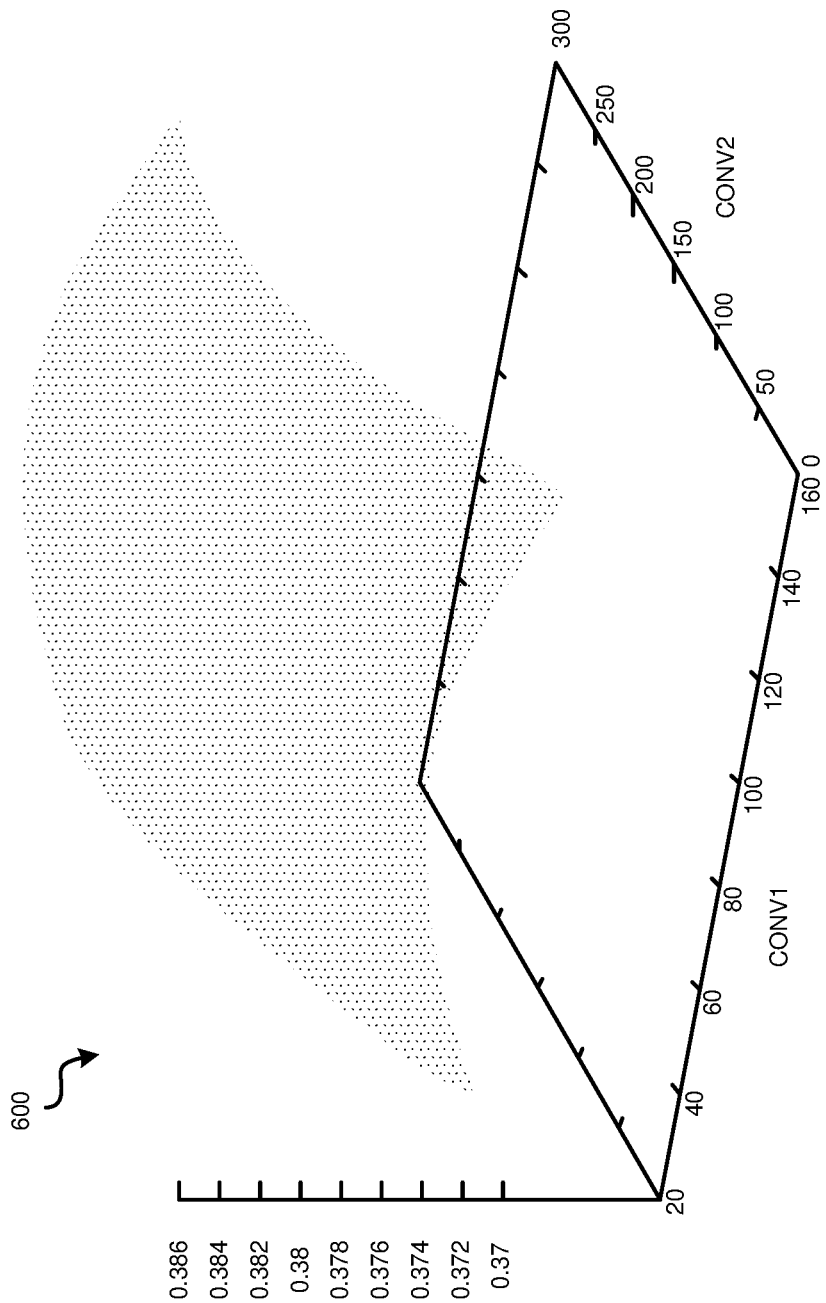
FIG. 6 depicts a plot illustrating effects of varying the hyperparameters for CONV1 and CONV2 on error rate in a CNN in accordance with an illustrative embodiment.
Figure 7:
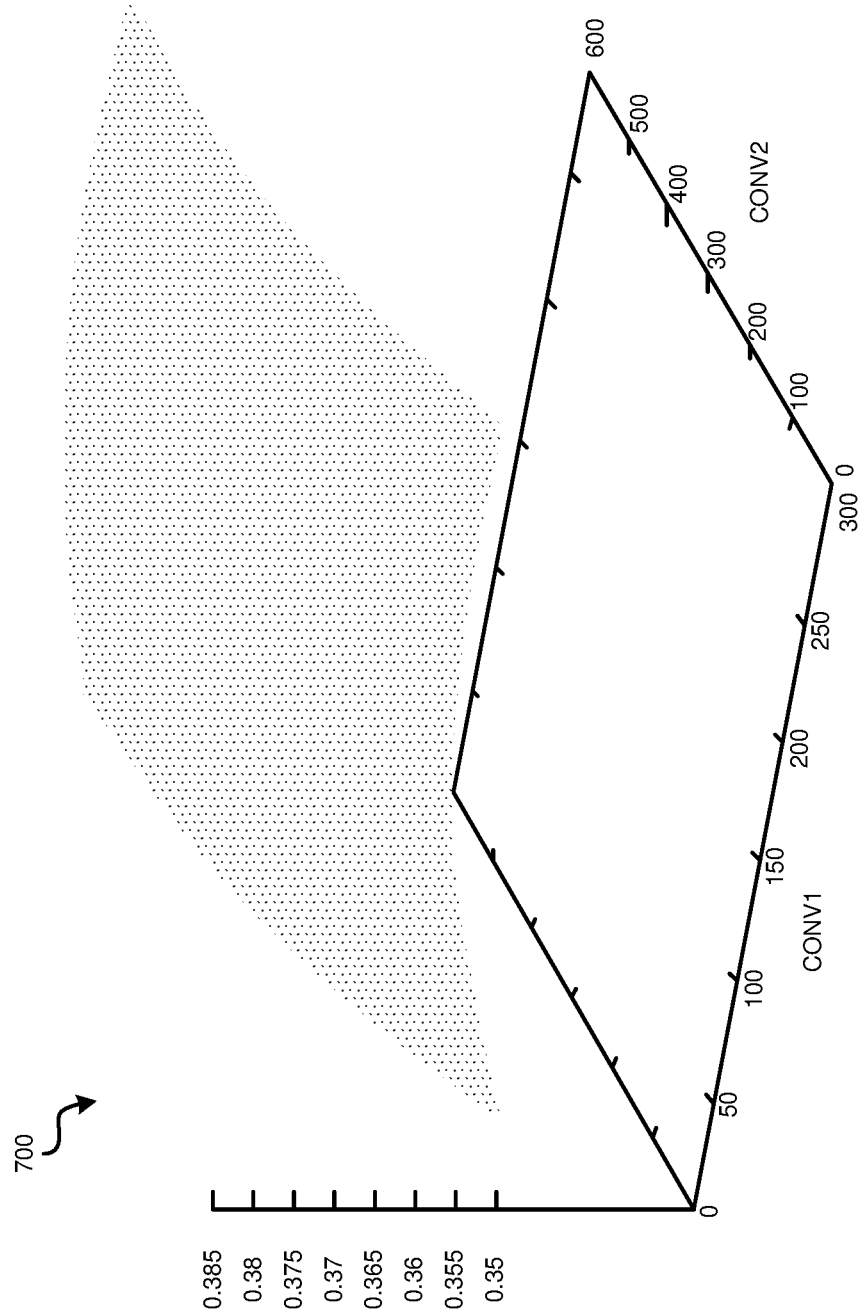
FIG. 7 depicts a plot illustrating effects of varying the hyperparameters for CONV2 and CONV3 on error rate in a CNN in accordance with an illustrative embodiment.
Figure 8:
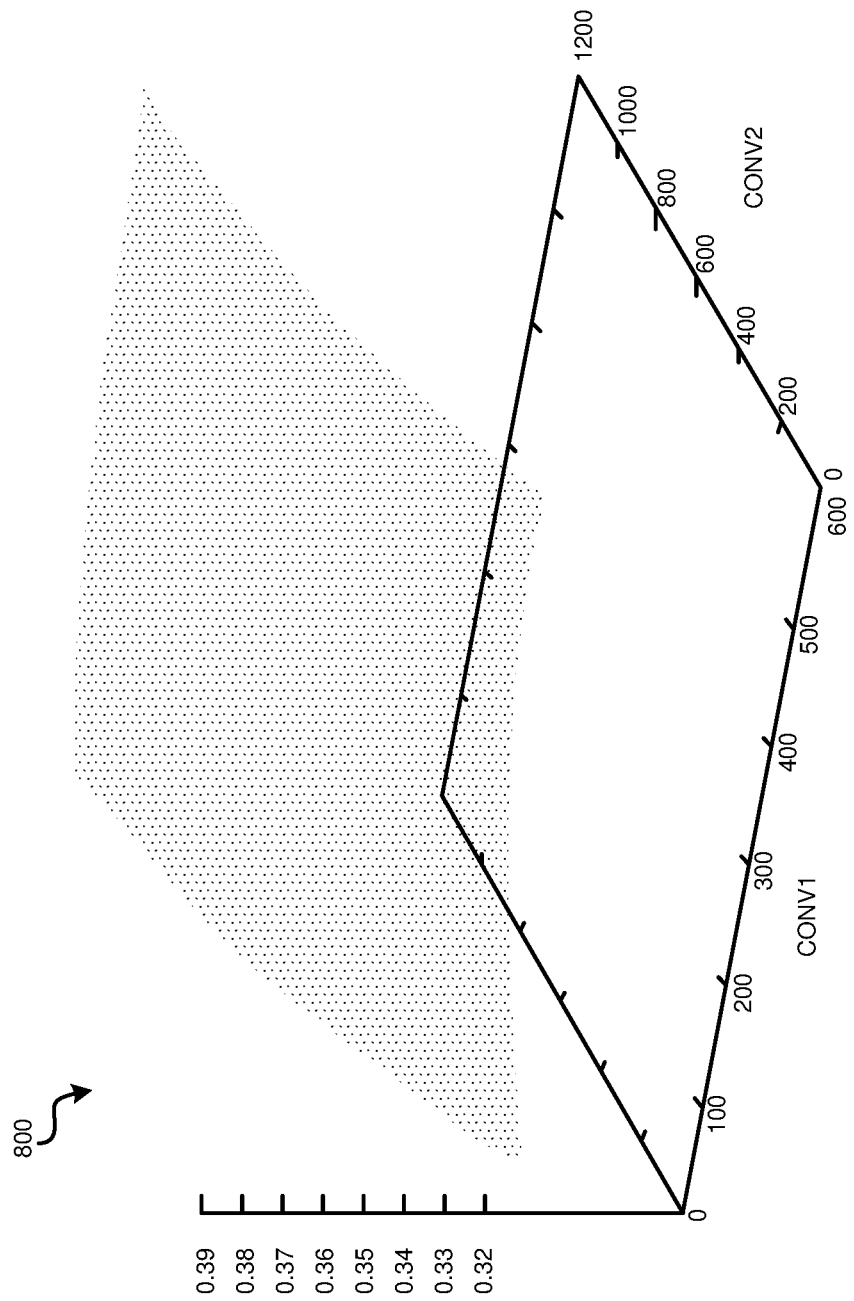
FIG. 8 depicts a plot illustrating effects of varying the hyperparameters for CONV3 and CONV4 on error rate in a CNN in accordance with an illustrative embodiment.
Figure 9:
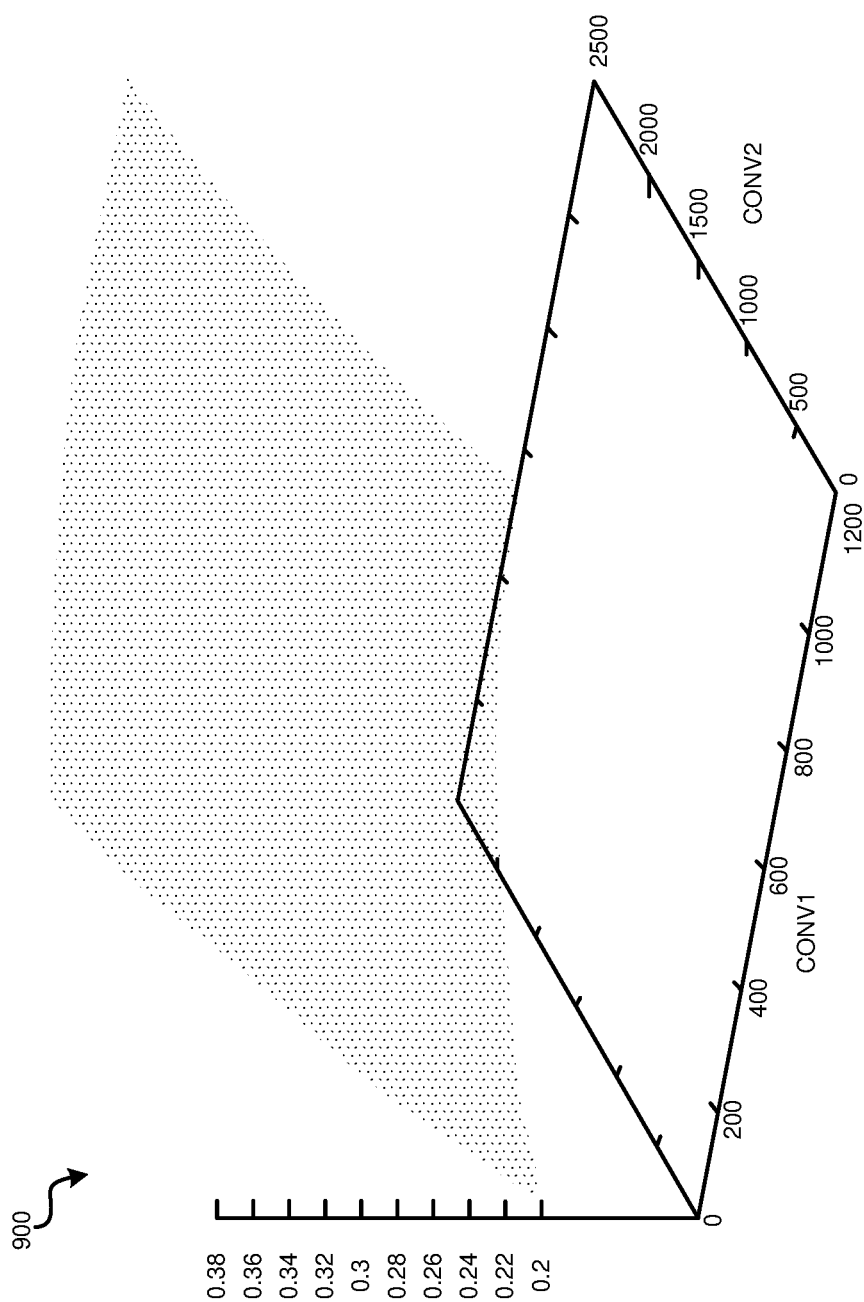
FIG. 9 depicts a plot illustrating effects of varying the hyperparameters for CONV4 and CONV5 on error rate in a CNN in accordance with an illustrative embodiment.

FIG. 6 depicts a plot 600 illustrating effects of varying the hyperparameters for CONV1 and CONV2 on error rate in a CNN in accordance with an illustrative embodiment. FIG. 7 depicts a plot 700 illustrating effects of varying the hyperparameters for CONV2 and CONV3 on error rate in a CNN in accordance with an illustrative embodiment. FIG. 8 depicts a plot 800 illustrating effects of varying the hyperparameters for CONV3 and CONV4 on error rate in a CNN in accordance with an illustrative embodiment. FIG. 9 depicts a plot 900 illustrating effects of varying the hyperparameters for CONV4 and CONV5 on error rate in a CNN in accordance with an illustrative embodiment.

FIGS. 6-9 thus show projections of the polyharmonic spline derived from the 14 measured points for (a, b, 600, 1200, 2400), (150, b, c, 1200, 2400), (150, 300, c, d, 2400), (150, 300, 600, d, e). The variables "a" to "e" are the number of filters in CONV1 to CONV5, respectively. The interpolation suggests that the parameter e (CONV5 number of filters) is the dominant limiting factor, it has the steepest slope at the edge of the 'box'. This matches an algebraic interpretation, 22,000 classes could benefit from a higher dimensional feature space. The earlier layers/group show maxima within the box for maximum values for the later layers, indicating that once the degrees of freedom of a later part of the network are saturated, adding more capacity to earlier layers becomes counterproductive.

Figure 10:
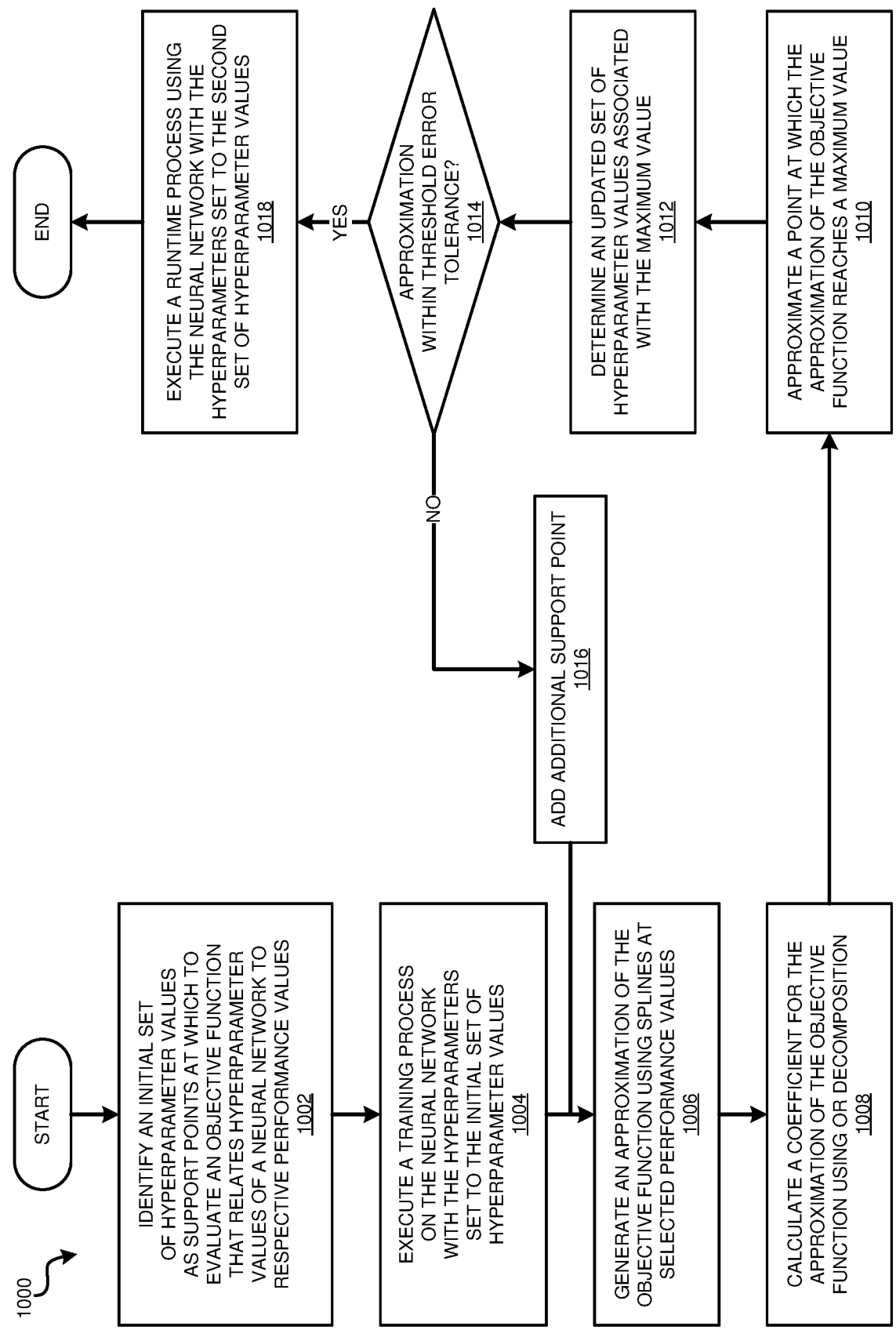
FIG. 10 depicts a depicts a flowchart of an example process 1000 for configuring a neural network using smoothing splines in accordance with an illustrative embodiment.

With reference to FIG. 10, this figure depicts a flowchart of an example process 1000 for configuring a neural network using smoothing splines in accordance with an illustrative embodiment. In a particular embodiment, the machine learning application 300 of FIG. 3 carries out the process 1000.

In the illustrated embodiment, at block 1002, the application identifies an initial set of hyperparameter values as support points at which to evaluate an objective function that relates hyperparameter values of a neural network to respective performance values, for example that provides measures of performance of the neural network. In an embodiment, the hyperparameter values are associated with respective different hyperparameters. In some embodiments, the neural network is a convolutional neural network. In some embodiments, the neural network is configured for classifying images. In some embodiments, the performance values comprise an error rate.

In the illustrated embodiment, at block 1004, the application executes a training process on the neural network with the hyperparameters set to the initial set of hyperparameter values. In an embodiment, the training process provides an initial set of the performance values for the objective function.

In the illustrated embodiment, at block 1006, the application generates an approximation of the objective function using splines at selected performance values. In some embodiments, the splines used for generating the approximation of the objective function comprise polyharmonic splines. In some embodiments, the application generates the approximation of the objective function using polyharmonic splines by assembling the approximation using radial basis functions.

In the illustrated embodiment, at block 1008, the application calculates a coefficient for the approximation of the objective function using QR decomposition. In some embodiments, the QR decomposition used for calculating the coefficient for the approximation of the objective function comprises a householder QR decomposition.

In the illustrated embodiment, at block 1010, the application approximates a point at which the approximation of the objective function reaches a maximum value. In some embodiments, the application approximates the point at which the approximation of the objective function reaches the maximum value comprises using a hierarchical Monte Carlo technique.

In the illustrated embodiment, at block 1012, the application determines an updated set of hyperparameter values associated with the maximum value.

In the illustrated embodiment, at block 1014, the application determines whether a performance metric of the approximation of the objective function, such as error rate, is within a desired tolerance. For example, in some embodiments, the application determines whether an error rate of the approximation of the objective function is below a predetermined or desired threshold value. If so, the application continues to block 1018, where the application executes a runtime process using the neural network with the hyperparameters set to the updated set of hyperparameter values and then the process ends. Otherwise, the process returns to block 1006 after, at block 1016, the application adds an additional support point. Thus, in the illustrated embodiment performs iterations of blocks 1006 to 1012 until the performance of the neural network is as desired or until the process is otherwise interrupted. For example, a user may determine that the process should be interrupted if it appears that the process is not resulting in convergence of performance-related values as desired.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
identifying a first set of support points comprising an initial plurality of sets of hyperparameter values at which to evaluate an objective function having coefficients that relate hyperparameter values of a neural network to respective performance values, wherein the respective performance values are representative of an error rate;
wherein the hyperparameter values comprise at least one of a dropout rate, a weight norm, a hidden layer size, a convolutional kernel size, a pooling size;
wherein the neural network is a convolutional neural network;
executing initial training processes on the neural network with hyperparameters set to the initial plurality of sets of hyperparameter values such that the initial training processes provide an initial set of the performance values, one for each set of hyperparameter values, for the objective function;
generating an approximation of the objective function using splines that pass through the first set of support points at selected performance values;
calculating a coefficient for the approximation of the objective function using QR decomposition, wherein the QR decomposition used for calculating the coefficient for the approximation of the objective function comprises a householder QR decomposition; approximating a point at which the approximation of the objective function reaches a maximum value using a hierarchical Monte Carlo technique;
determining an updated set of support points comprising an updated set of hyperparameter values associated with the maximum value, wherein the updated set of hyperparameter values comprises a value of a network subcell layout parameter; and
executing an updated training process on the neural network with hyperparameters set to the updated set of hyperparameter values.

2. The computer-implemented method of claim 1, wherein the splines used for generating the approximation of the objective function comprise polyharmonic splines.

3. The computer-implemented method of claim 2, wherein the generating of the approximation of the objective function comprises using the polyharmonic splines comprising assembling the approximation using radial basis functions.

4. The computer-implemented method of claim 1, wherein the neural network is configured for classifying types of data selected from the group consisting of image data, audio data, and text data.

5. The computer-implemented method of claim 1, wherein the performance values provide measures of performance of the neural network.

6. A computer program product comprising one or more computer readable storage media, and program instructions collectively stored on the one or more computer readable storage media, the program instructions executable by a processor to cause the processor to perform operations comprising:
wherein the stored program instructions are stored in a computer readable storage device in a data processing system, and wherein the stored program instructions are transferred over a network from a remote data processing system;
identifying a first set of support points comprising an initial plurality of sets of hyperparameter values at which to evaluate an objective function having coefficients that relate hyperparameter values of a neural network to respective performance values, wherein the respective performance values are representative of an error rate;
executing initial training processes on the neural network with hyperparameters set to the initial plurality of sets of hyperparameter values such that the initial training processes provide an initial set of the performance values, one for each set of hyperparameter values, for the objective function;
generating an approximation of the objective function using splines that pass through the first set of support points at selected performance values;
calculating a coefficient for the approximation of the objective function using QR decomposition, wherein the QR decomposition used for calculating the coefficient for the approximation of the objective function comprises a householder QR decomposition;
approximating a point at which the approximation of the objective function reaches a maximum value using a hierarchical Monte Carlo technique;
determining an updated set of support points comprising an updated set of hyperparameter values associated with the maximum value, wherein the updated set of hyperparameter values comprises a value of a network subcell layout parameter; and
executing an updated training process on the neural network with hyperparameters set to the updated set of hyperparameter values.

7. The computer program product of claim 6, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

8. The computer program product of claim 6, wherein the neural network is a convolutional neural network.

9. The computer program product of claim 6, wherein the splines used for generating the approximation of the objective function comprise polyharmonic splines.

10. The computer program product of claim 9, wherein the generating of the approximation of the objective function comprises using the polyharmonic splines comprising assembling the approximation using radial basis functions.

11. A computer system comprising a processor and one or more computer readable storage media, and program instructions collectively stored on the one or more computer readable storage media, the program instructions executable by the processor to cause the processor to perform operations comprising:
- wherein the stored program instructions are stored in a computer readable storage device in a data processing system, and wherein the stored program instructions are transferred over a network from a remote data processing system;
- identifying a first set of support points comprising an initial plurality of sets of hyperparameter values at which to evaluate an objective function having coefficients that relate hyperparameter values of a neural network to respective performance values, wherein the respective performance values are representative of an error rate;
- executing initial training processes on the neural network with hyperparameters set to the initial plurality of sets of hyperparameter values such that the initial training processes provide an initial set of the performance values, one for each set of hyperparameter values, for the objective function;
- generating an approximation of the objective function using splines that pass through the first set of support points at selected performance values;
- calculating a coefficient for the approximation of the objective function using QR decomposition, wherein the QR decomposition used for calculating the coefficient for the approximation of the objective function comprises a householder QR decomposition;
- approximating a point at which the approximation of the objective function reaches a maximum value using a hierarchical Monte Carlo technique;
- determining an updated set of support points comprising an updated set of hyperparameter values associated with the maximum value, wherein the updated set of hyperparameter values comprises a value of a network subcell layout parameter; and
- executing an updated training process on the neural network with hyperparameters set to the updated set of hyperparameter values.

12. The computer system of claim 11, wherein the splines used for generating the approximation of the objective function comprise polyharmonic splines.

13. The computer system of claim 12, wherein the generating of the approximation of the objective function comprises using the polyharmonic splines comprising assembling the approximation using radial basis functions.

* * * * *